United States Patent
Stang et al.

(10) Patent No.: US 11,123,678 B2
(45) Date of Patent: Sep. 21, 2021

(54) AIR FILTRATION DEVICE

(71) Applicant: GPL Odorizers LLC, Lakewood, CO (US)

(72) Inventors: Adrian Charles Stang, Arvada, CO (US); Charles Spencer Toft, Centennial, CO (US)

(*) Notice: Subject to any disclaimer, the term of this patent is extended or adjusted under 35 U.S.C. 154(b) by 0 days.

(21) Appl. No.: 17/307,422

(22) Filed: May 4, 2021

(65) Prior Publication Data
US 2021/0252450 A1    Aug. 19, 2021

(51) Int. Cl.
B01D 53/04 (2006.01)

(52) U.S. Cl.
CPC .... B01D 53/0446 (2013.01); *B01D 2253/102* (2013.01); *B01D 2253/304* (2013.01); *B01D 2253/306* (2013.01); *B01D 2253/311* (2013.01); *B01D 2257/306* (2013.01); *B01D 2259/4541* (2013.01)

(58) Field of Classification Search
CPC ........... B01D 53/04; B01D 53/0446; B01D 2253/102; B01D 2253/304; B01D 2253/306; B01D 2253/311; B01D 2257/306; B01D 2259/4541
USPC ................................ 96/147, 151; 422/122
See application file for complete search history.

(56) References Cited

U.S. PATENT DOCUMENTS

| 2,404,468 | A | | 7/1946 | Vokes et al. | |
|---|---|---|---|---|---|
| 3,339,343 | A | * | 9/1967 | Van Buuren | B01J 20/22 95/92 |
| 3,766,844 | A | * | 10/1973 | Donnelly | F24F 8/10 454/238 |
| 4,312,291 | A | * | 1/1982 | Knab | B01D 53/0446 118/426 |
| 4,421,534 | A | * | 12/1983 | Walker | B01D 53/84 435/266 |
| 4,512,245 | A | * | 4/1985 | Goldman | B08B 15/002 454/63 |
| 4,961,763 | A | * | 10/1990 | Thompson | B01D 53/85 55/312 |
| 4,968,333 | A | * | 11/1990 | Ellis | B01D 46/06 15/301 |
| 5,207,808 | A | | 5/1993 | Haruta et al. | |
| 5,399,319 | A | * | 3/1995 | Schoenberger | A61L 9/20 422/121 |
| 5,407,647 | A | | 4/1995 | Tarancon | |
| 5,409,834 | A | * | 4/1995 | Birdwell | B01D 53/84 435/294.1 |
| 5,509,956 | A | | 4/1996 | Opperman et al. | |
| 5,529,614 | A | | 6/1996 | Engler et al. | |
| 5,635,394 | A | * | 6/1997 | Horn | B01D 53/85 435/266 |
| 5,814,129 | A | | 9/1998 | Tentarelli | |
| 5,843,206 | A | | 12/1998 | Dehn et al. | |

(Continued)

*Primary Examiner* — Frank M Lawrence, Jr.
(74) *Attorney, Agent, or Firm* — Thomas J. Lavan

(57) ABSTRACT

A device is provided. The device includes one or more of a container, filtration media, and a vacuum apparatus. The container includes a first hole in a first end of the container and a second hole in a second end of the container opposite the first end. The filtration media is disposed within the container, and is configured to absorb an odor present in inlet air. The vacuum apparatus is coupled to the first hole, and is configured to pull inlet air through the filtration media from the second hole and provide filtered air to the first hole.

19 Claims, 9 Drawing Sheets

(56) References Cited

U.S. PATENT DOCUMENTS

| | | | |
|---|---|---|---|
| 5,910,165 A | 6/1999 | Haramoto et al. | |
| 6,152,996 A | 11/2000 | Linnersten et al. | |
| 6,217,639 B1 | 4/2001 | Jackson | |
| 6,179,903 B1 | 6/2001 | Muller | |
| 6,332,916 B1 | 12/2001 | Chinn et al. | |
| 6,402,613 B1 * | 6/2002 | Teagle | F04D 19/002 |
| | | | 454/195 |
| 6,468,333 B2 | 10/2002 | Spiegelman et al. | |
| 6,824,596 B2 | 11/2004 | Strmen | |
| 2001/0017080 A1 | 8/2001 | Dozoretz et al. | |
| 2004/0159238 A1 * | 8/2004 | Strmen | B01D 53/0454 |
| | | | 96/109 |
| 2007/0056307 A1 * | 3/2007 | Caggiano | B01D 53/261 |
| | | | 62/271 |
| 2012/0304866 A1 * | 12/2012 | Barrett | F04D 27/00 |
| | | | 96/244 |
| 2014/0020561 A1 * | 1/2014 | Aery | B01D 46/2411 |
| | | | 96/224 |
| 2015/0140643 A1 * | 5/2015 | Jain | B01D 53/04 |
| | | | 435/266 |
| 2016/0317694 A1 * | 11/2016 | Leonaggeo | B01D 53/0407 |

* cited by examiner

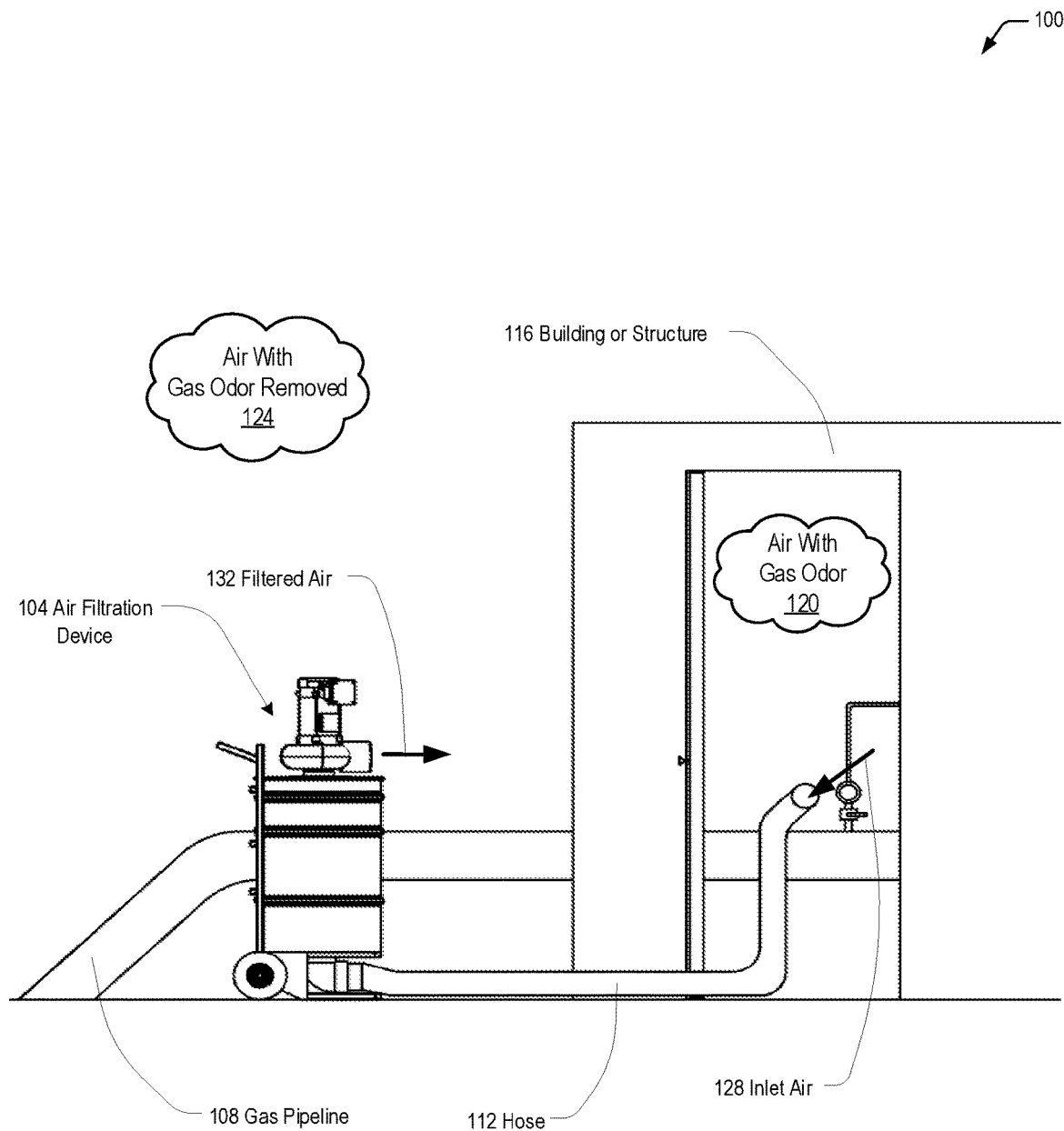
Fig. 1 Air Filtration System

Fig. 2A Unmounted Air Filtration Device Isometric View
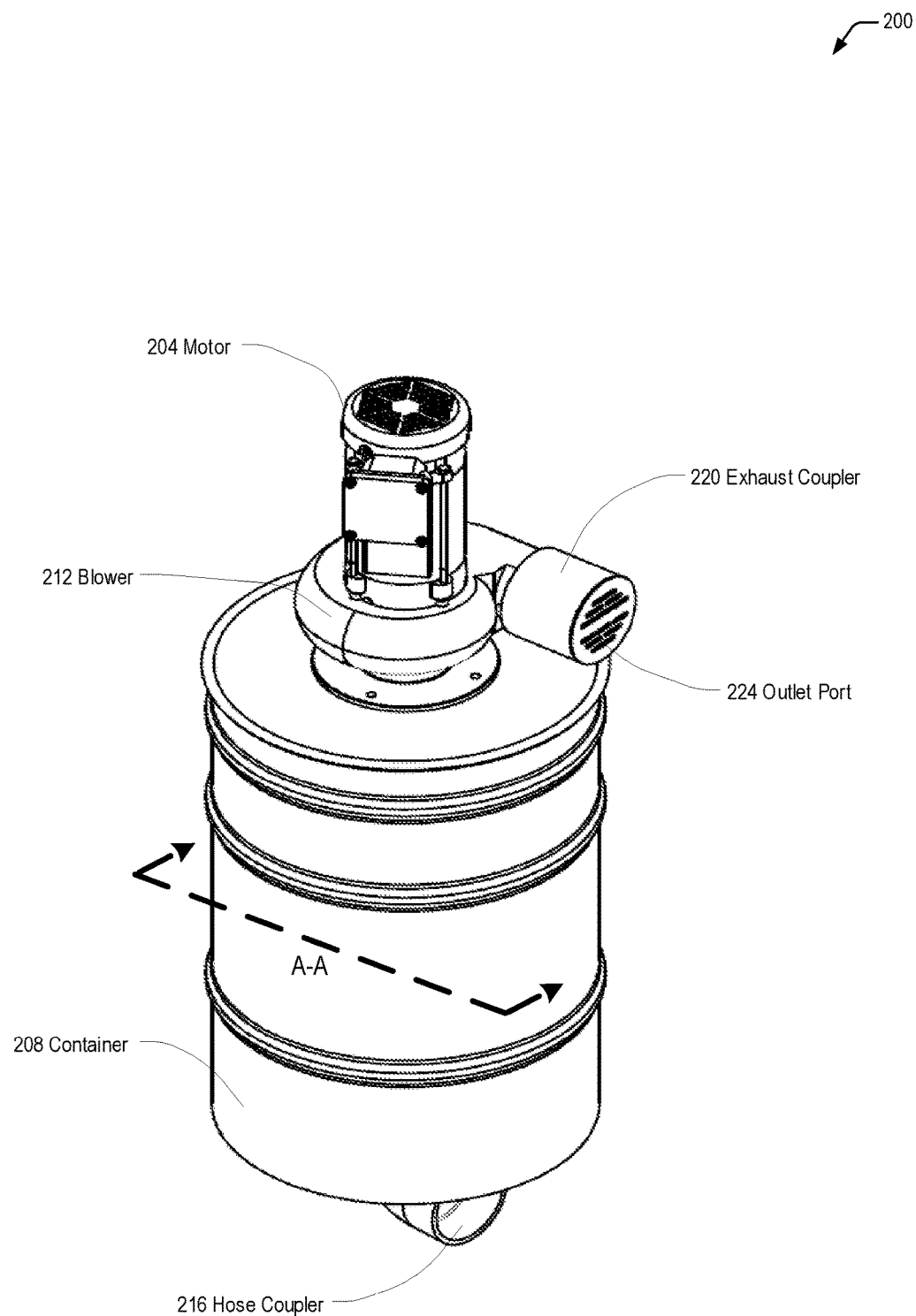

Fig. 2B Unmounted Air Filtration Device Side View
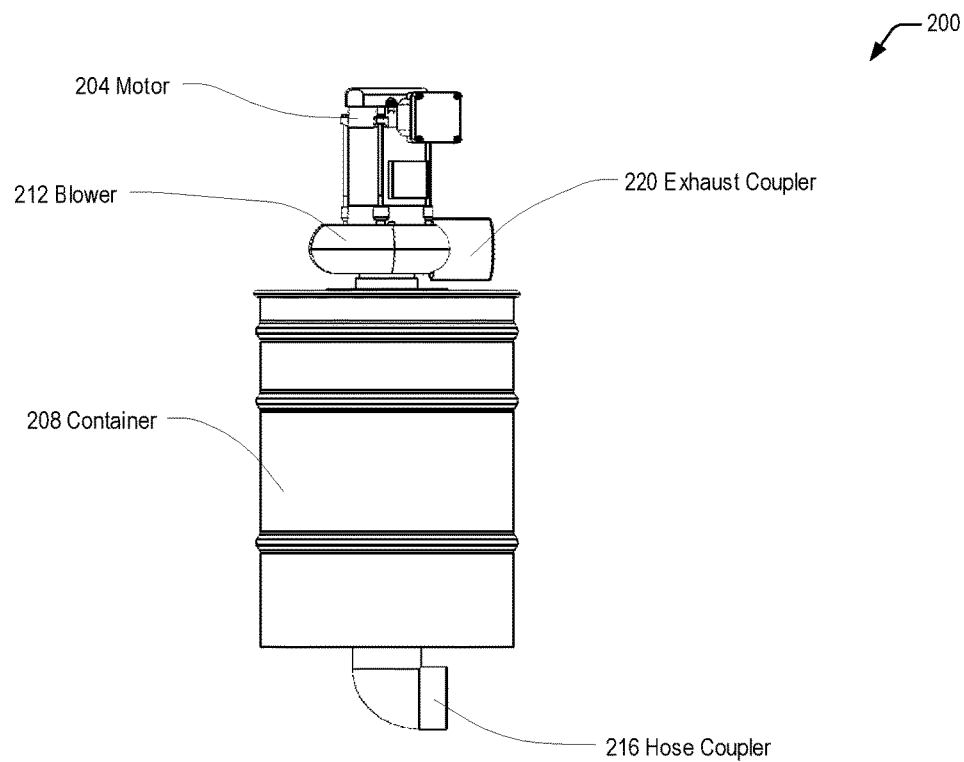
Fig. 2C Unmounted Air Filtration Device Front View
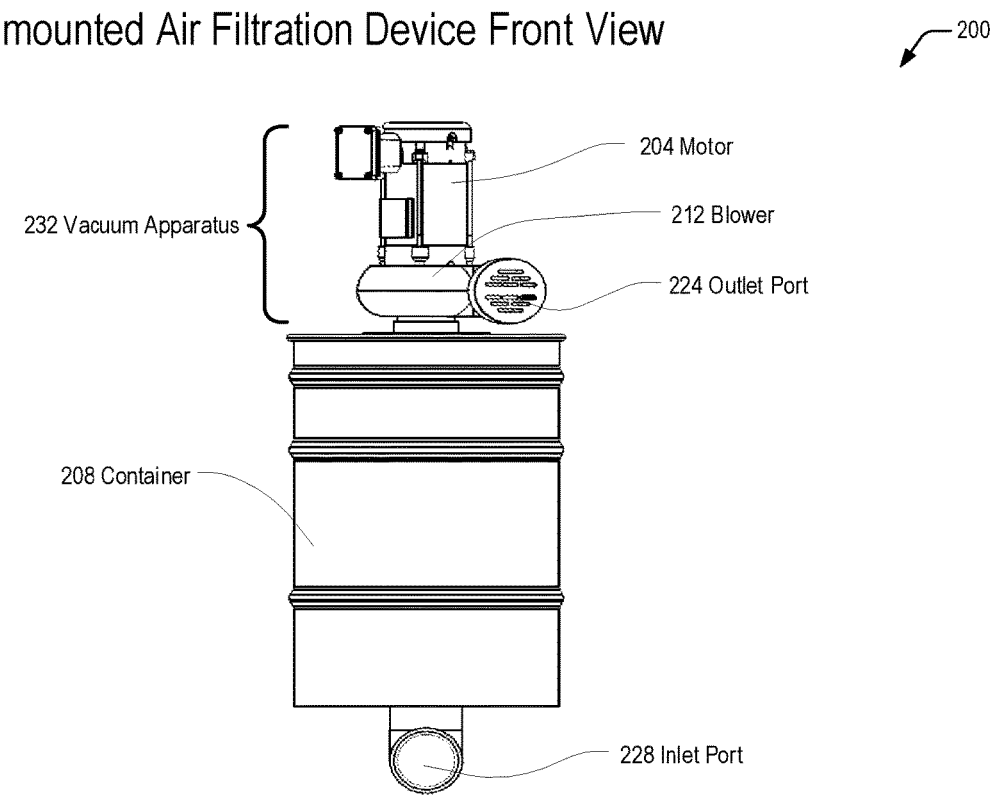

Fig. 2D Unmounted Air Filtration Device Section A-A View
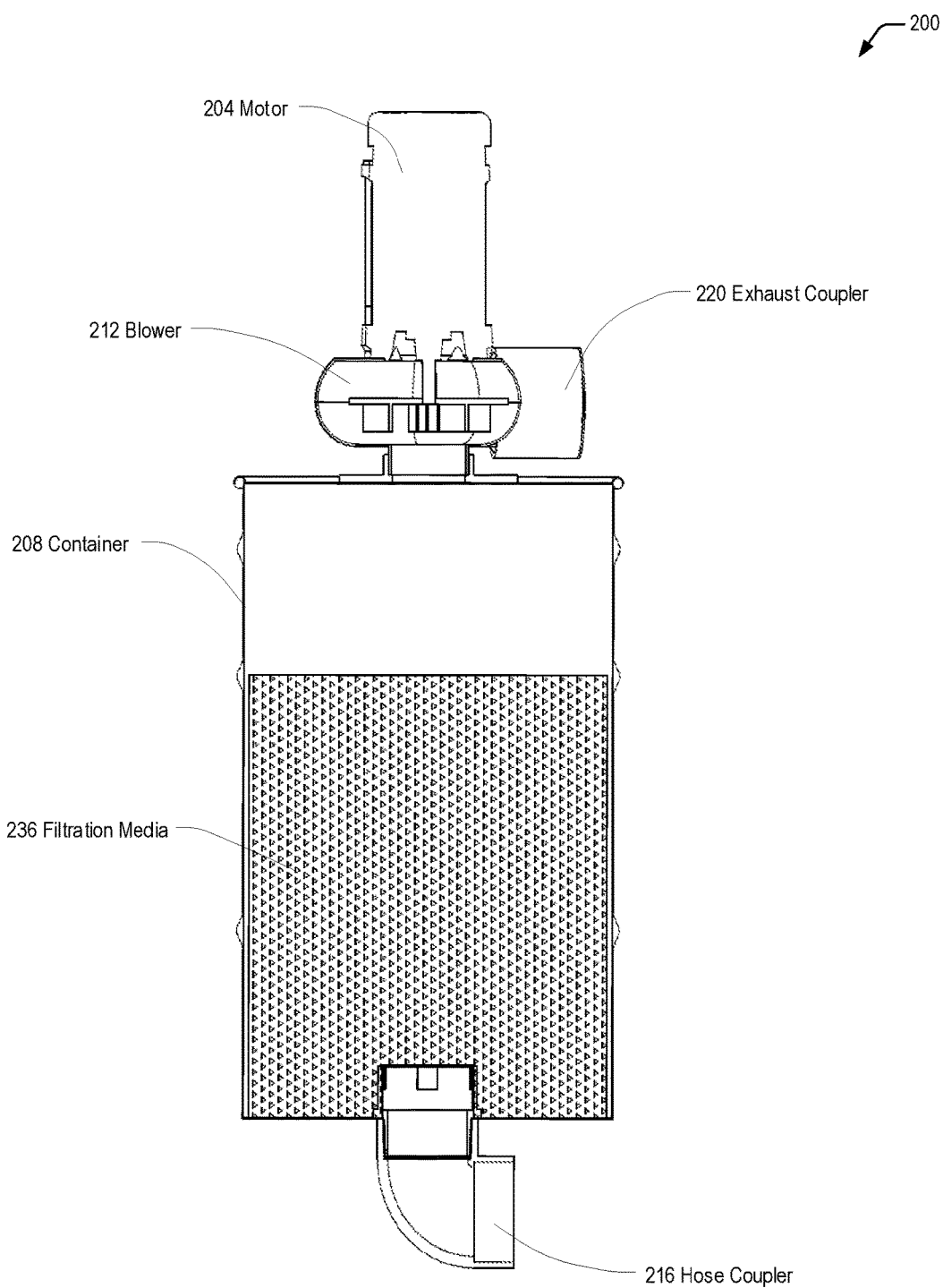

Fig. 2E Unmounted Air Filtration Device Exploded View
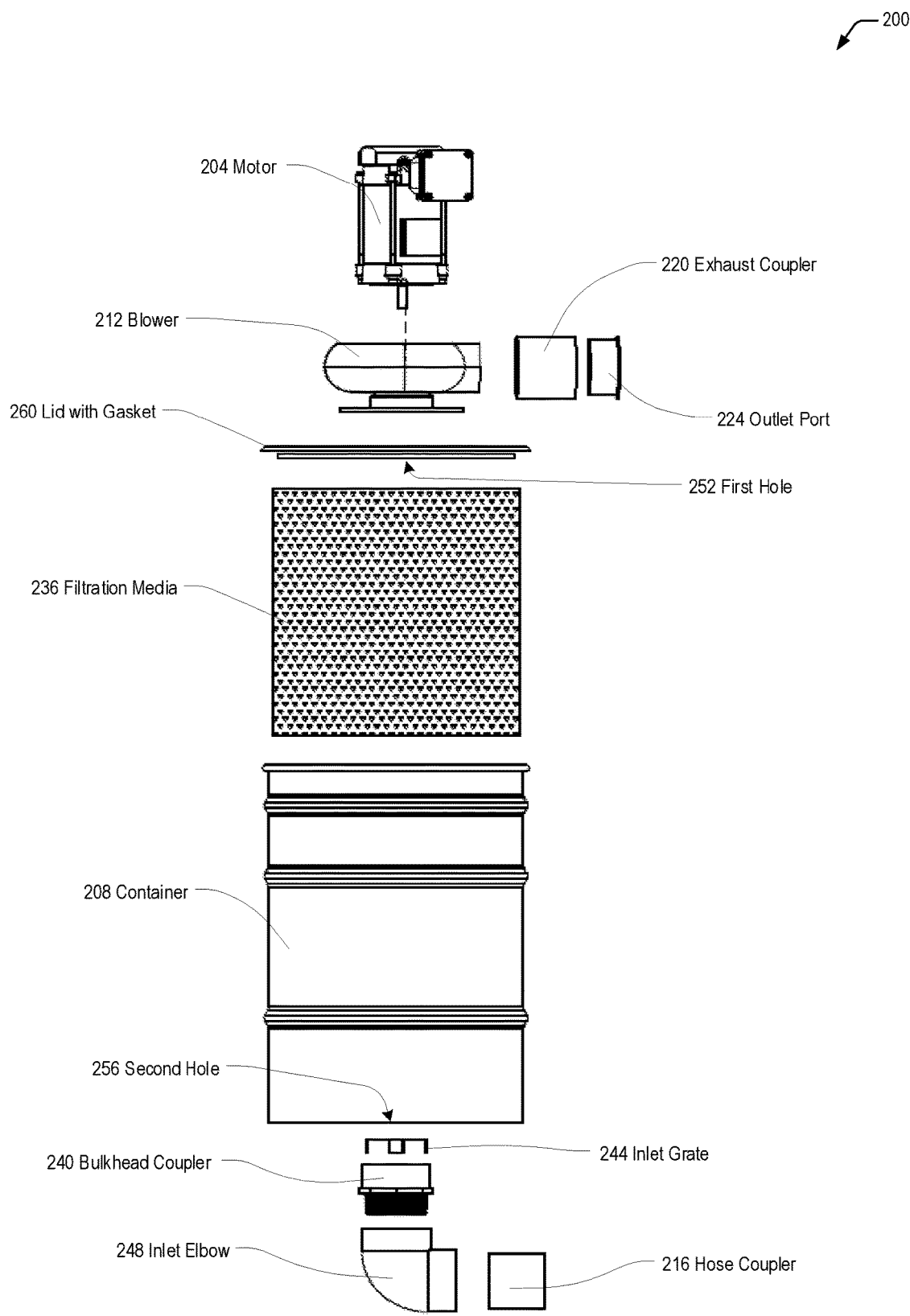

Fig. 3A Cart Isometric View
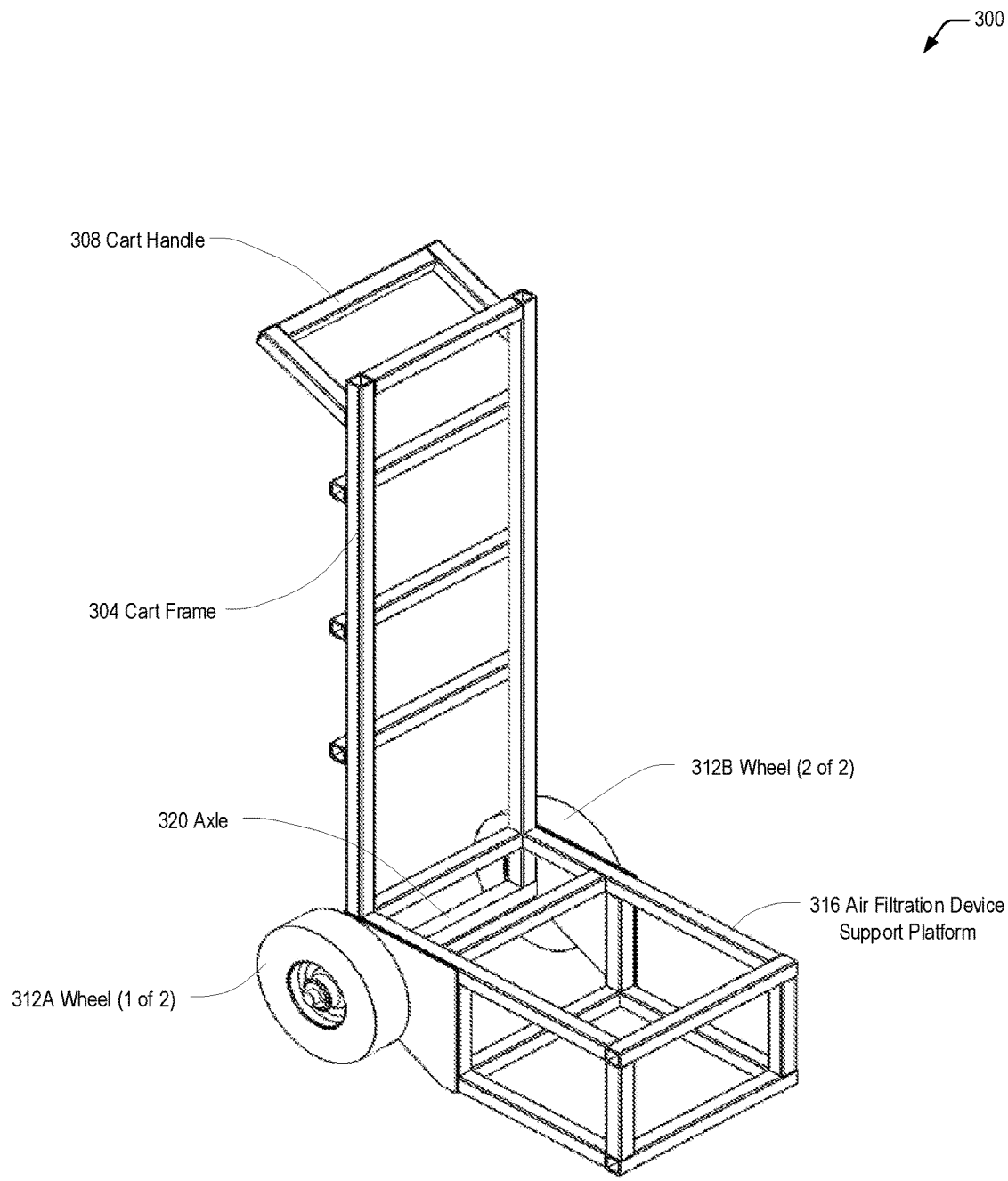

Fig. 3B  Cart Side View
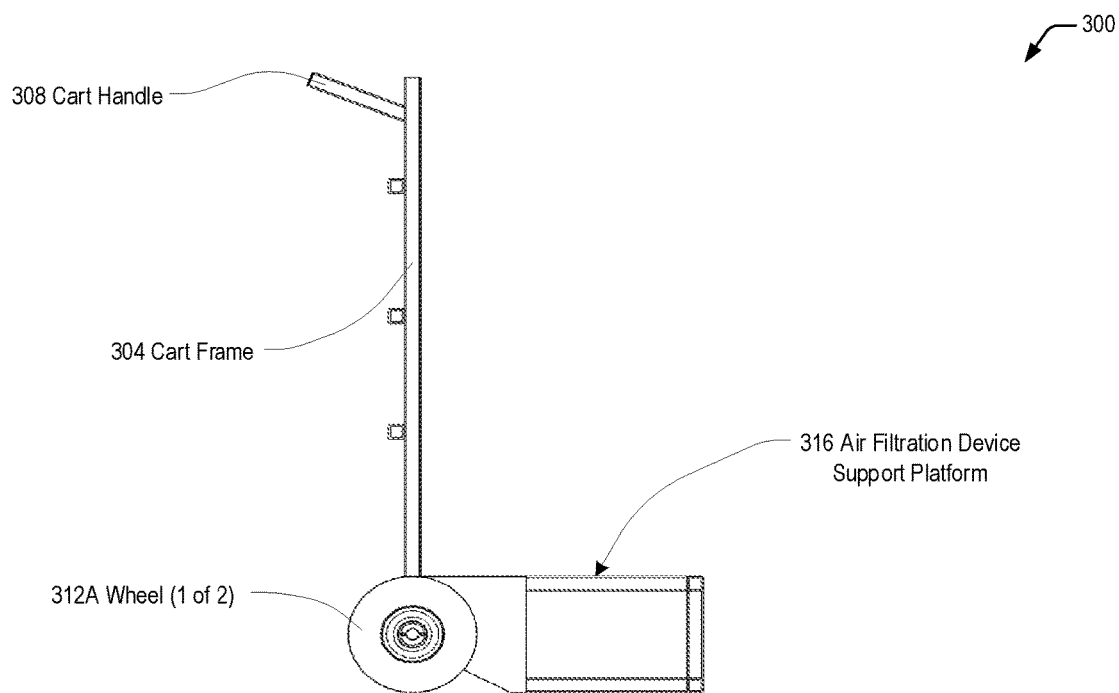
Fig. 3C  Cart Front View
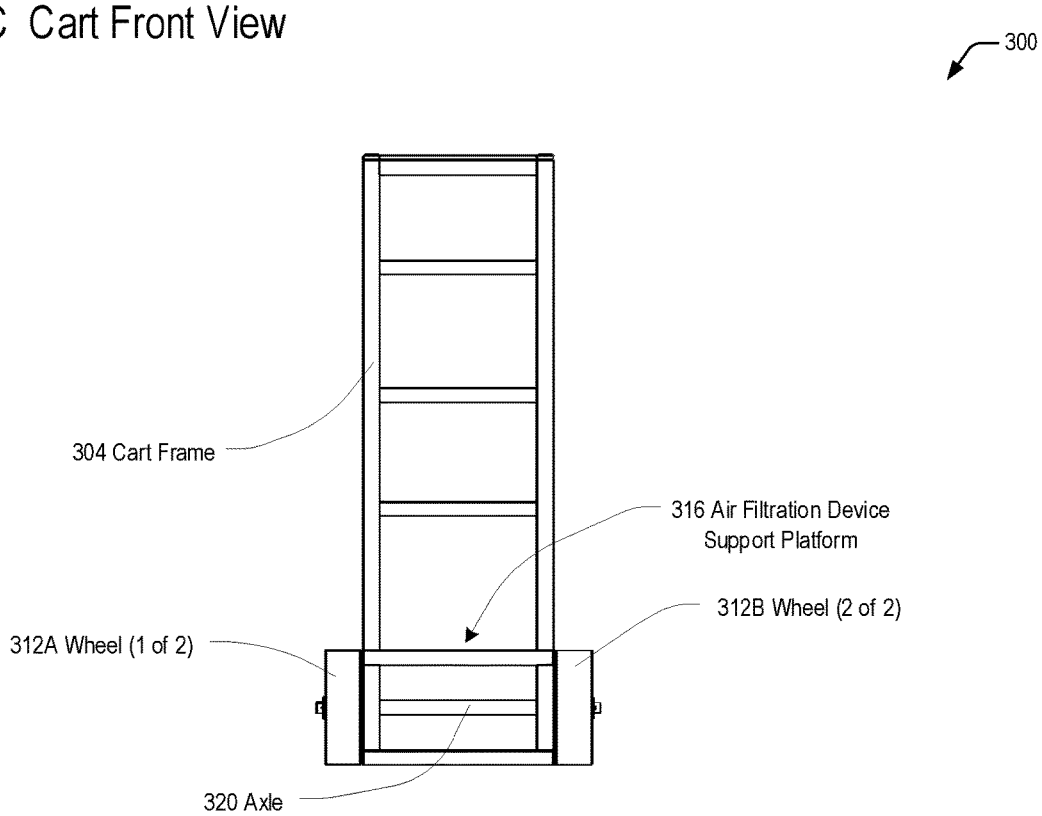

Fig. 4A Mounted Air Filtration Device Isometric View
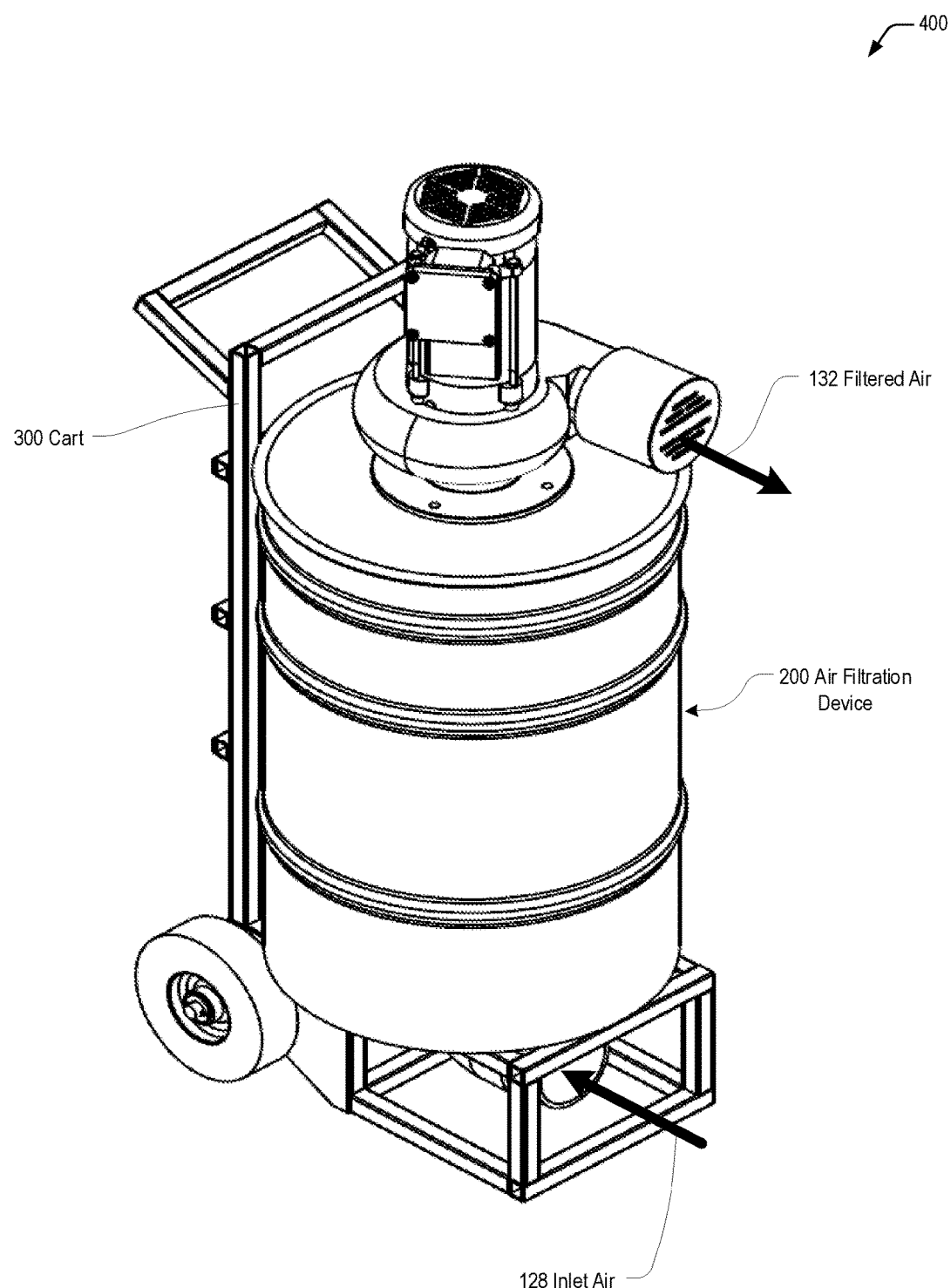

Fig. 4B Mounted Air Filtration Device Side View
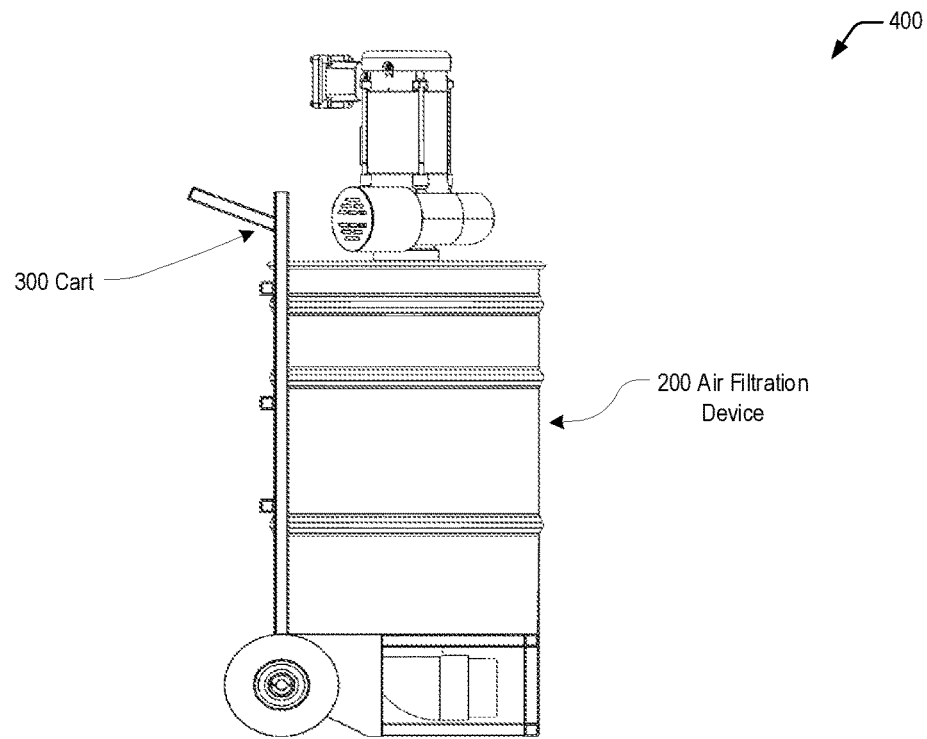
Fig. 4C Mounted Air Filtration Device Front View
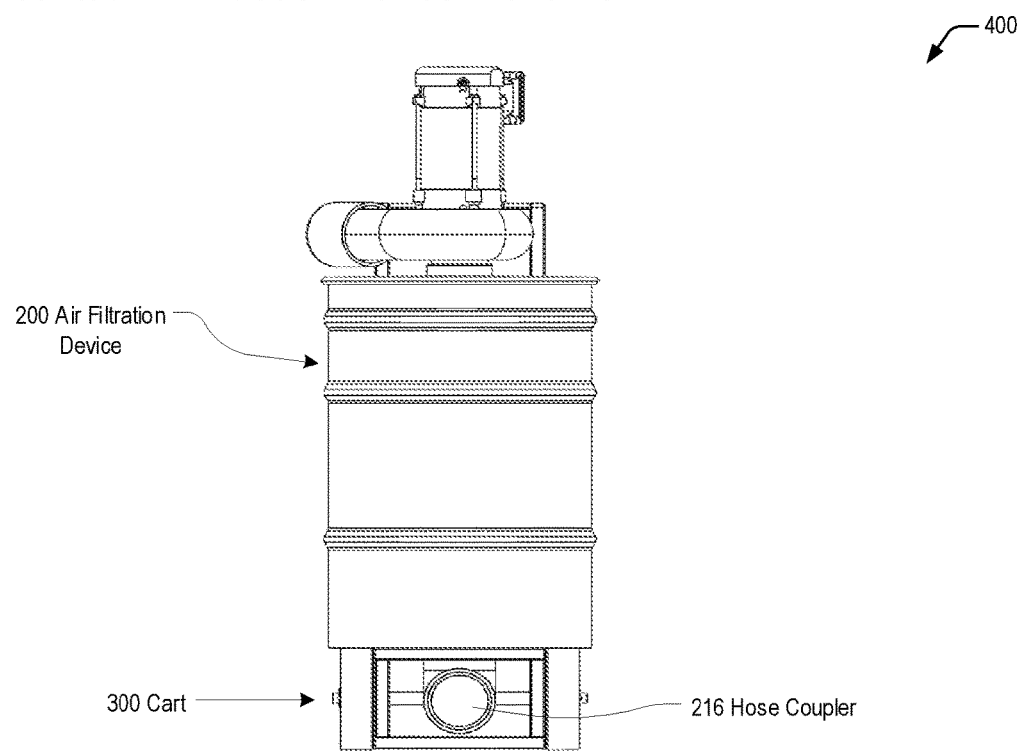

AIR FILTRATION DEVICE

FIELD

The present invention is directed to apparatuses and systems for filtering odorant from gases. In particular, the present invention is directed to apparatuses and systems for removing Mercaptan odor from natural gas.

BACKGROUND

Odorants may be added to odorless gases, such as natural gas, so that they can be detected easily by human smell. Conventional odorants include mercaptans, methyl sulfides, aliphatic sulfides, dimethylsulfide as well as various blends of other commonly accepted chemicals. Odorants that may be used with natural gas are extremely odiferous and volatile, so that only a small amount of liquid is needed to odorize a relatively large volume of natural gas.

Various techniques have been developed for odorizing natural gas. One technique consists of injecting liquid odorant directly into natural gas pipelines. A high pressure injection pump draws odorants from a liquid storage tank into the gas pipeline where the odorants evaporate throughout the gas in the pipeline. Liquid odorant pressure is typically stepped down in the injection system and the released pressure is directed into an expansion tank. At regular intervals, gas may be released from the expansion tank so as to maintain the pressure within the expansion tank under a predetermined pressure threshold. The gas released from the expansion tank may be typically passed through a filter before being discharged as an odorant-free gas.

A second technique for odorizing natural gas consists of bypassing a small amount of natural gas through a tank containing liquid odorant. The bypass gas leaves the tank saturated with odorant gas and is then returned back into a main gas pipeline where it diffuses throughout the pipeline. The odorizing equipment is typically depressurized during odorant re-fill and the released odorant gas is typically flared or filtered by adsorption before being discharged as a non-toxic odorless gas.

In some instances, the failure of such odorizing equipment may result in odorant being released into the surrounding environment. Servicing operations on the equipment and re-filling of the storage tank may also generally be associated with the release of odoriferous gases into the atmosphere. Due to the dangerous nature of odorous gases and the ever increasing sensitivity of public to odors, it is essential to minimize odorant smell releases, which may not be associated with leaks of the natural gas distribution system.

SUMMARY

In accordance with embodiments of the present invention, a device is provided. The device includes one or more of a container, filtration media, and a vacuum apparatus. The container includes a first hole in a first end of the container and a second hole in a second end of the container opposite the first end. The filtration media is disposed within the container, and is configured to absorb an odor present in inlet air. The vacuum apparatus is coupled to the first hole, and is configured to pull inlet air through the filtration media from the second hole and provide filtered air to the first hole.

In accordance with embodiments of the present invention, a system is provided. The system includes one or more of an air filtration device and a hose. The air filtration device may include a container, filtration media, and a vacuum apparatus. The container includes a first hole to provide filtered air outside the container and a second hole to receive inlet air. The filtration media is disposed within the container, and is configured to absorb an odor present in the inlet air. The vacuum apparatus is coupled to the first hole, and is configured to pull inlet air through the filtration media from the second hole to the first hole and provide filtered air through an outlet port coupled to the vacuum apparatus. The hose is coupled to the container.

An advantage of the present invention is it provides a portable system for efficiently removing odors within an area. Depending on the type of odor present at a location, different filtration media may be used to provide the greatest efficiency for absorbing a given odor.

Another advantage of the present invention is it provides means for easy replacement of filtration media. Filtration media absorbs odors in inlet air, and may become saturated over time. When saturated, the filtration media may no longer be able to absorb odors in inlet air, requiring filtration media replacement.

Yet another advantage of the present invention is it eliminates air gaps around the filtration media by not requiring a basket or other holding device within the container for the filtration media.

Additional features and advantages of embodiments of the present invention will become more readily apparent from the following description, particularly when taken together with the accompanying drawings.

BRIEF DESCRIPTION OF THE DRAWINGS

FIG. 1 is an illustration depicting an air filtration system in accordance with embodiments of the present invention.

FIG. 2A is an illustration depicting an isometric view of an unmounted air filtration device in accordance with embodiments of the present invention.

FIG. 2B is an illustration depicting a side view of the unmounted air filtration device in accordance with embodiments of the present invention.

FIG. 2C is an illustration depicting a front view of the unmounted air filtration device in accordance with embodiments of the present invention.

FIG. 2D is an illustration depicting a section view of the unmounted air filtration device in accordance with embodiments of the present invention.

FIG. 2E is an illustration depicting an exploded view of the unmounted air filtration device in accordance with embodiments of the present invention.

FIG. 3A is an illustration depicting an isometric view of a cart in accordance with embodiments of the present invention.

FIG. 3B is an illustration depicting a side view of the cart in accordance with embodiments of the present invention.

FIG. 3C is an illustration depicting a front view of the cart in accordance with embodiments of the present invention.

FIG. 4A is an illustration depicting an isometric view of a mounted air filtration device in accordance with embodiments of the present invention.

FIG. 4B is an illustration depicting a side view of the mounted air filtration device in accordance with embodiments of the present invention.

FIG. 4C is an illustration depicting a front view of the mounted air filtration device in accordance with embodiments of the present invention.

DETAILED DESCRIPTION

The present invention is directed to devices and systems for filtering an odor from atmospheric air at a location. The devices and systems provide air movement through filtration media and provide filtered air to a same or a different location as the air containing an odor.

Referring now to FIG. 1, an illustration depicting an air filtration system 100 in accordance with embodiments of the present invention is shown. The air filtration system 100 draws inlet air 128 from a location having air with a gas odor 120, such as from mercaptan. The inlet air 128 is drawn to an air filtration device 104, which filters the mercaptan odor from the air and may provide filtered air 132 at a location having air with the gas odor removed 124. The location having air with the gas odor 120 may be different than the location having air with gas odor removed 124. In one embodiment, the location having air with the gas odor present 120 may be located within a building or structure 116. The building or structure 116 may be in proximity to a gas pipeline 108.

In one embodiment, a hose 112 may allow the air filtration device 104 to draw inlet air 128 from the building or structure 116 and/or location having air with a gas odor 120. In another embodiment (not shown), the air filtration device 104 may provide filtered air 132 through a hose 112 to a location having air with a gas odor removed 124. In yet another embodiment (also not shown), the air filtration device 104 may receive inlet air 128 through a first hose 112 from the building or structure 116 and/or location having air with a gas odor 120 and also provide filtered air 132 through a second hose 112 to a location having air with a gas odor removed 124. The air with gas odor removed 124 may be within a same or different building or structure 116 as the air with the gas odor 120. In one embodiment, the inlet air 128 may be drawn from a same location as the filtered air 132 is provided, in order to filter air within an area with gas odor present 120 and reduce gas odor over time. In this embodiment, no hose(s) 112 may be present and the air filtration device 104 may be located within a location having a gas odor 120 present.

In the illustrated embodiment, the air filtration device 104 is mounted to a wheeled cart 300 in order to provide a form of mobility. In other embodiments, the air filtration device 104 may not be mounted to a cart 300 or other mobility device, or the cart 300 or mobility device may be integrated within the air filtration device 104 in a permanent fashion.

Referring now to FIG. 2A, an illustration depicting an isometric view of an unmounted air filtration device 200 in accordance with embodiments of the present invention is shown. The unmounted air filtration device 200 may include a container 208 and filtration media 236 within the container 208 (not shown). In one embodiment, the container 200 may be a drum or other common form of container manufactured out of a rigid and air tight material, including but not limited to aluminum, steel, plastics, or polymers. The unmounted air filtration device 200 may include an inlet port through which inlet air 128 may be drawn and a hose coupler 216 to facilitate attachment of a hose 112 to the inlet port. The unmounted air filtration device 200 may also include a motor 204, which may drive a blower 212 to blow filtered air 132 out an outlet port 224 through an exhaust coupler 220. In one embodiment, the exhaust coupler 220 may serve as a hose 112 attachment point, as described previously. FIG. 2A shows the blower 212 fastened to a top surface of the container 208. In the preferred embodiment, the inlet port and hose coupler 216 may be present on an opposite side of the container 208 as the blower 212. In one embodiment, this may require a stand for stationary applications or a cart 300 for mobile applications in order to provide vertical offset for the inlet port/hose coupler 216 and provide support to allow the unmounted air filtration device 200 to stand vertically.

Referring now to FIG. 2B, an illustration depicting a side view of the unmounted air filtration device 200 in accordance with embodiments of the present invention is shown. FIG. 2B shows a right angle bend in the inlet port area including the hose coupler 216. This allows a hose 212 to be attached horizontally to the hose coupler 216 when the air filtration device 200 is standing vertically as shown and mounted to a stand or cart 300 to provide vertical offset for the air filtration device 200.

Referring now to FIG. 2C, an illustration depicting a front view of the unmounted air filtration device 200 in accordance with embodiments of the present invention is shown. The front view of the air filtration device 200 shows a vacuum apparatus 232 that includes the motor 204 and the blower 212. The vacuum apparatus 232 controls the operation of the air filtration device 200 when the motor 204 is activated. In one embodiment, the motor 204 may have an on/off switch to allow a user to manually turn on or off the air filtration device 200. In another embodiment, the motor 204 may be activated by plugging a power cord into a power source, such as a standard 120V AC outlet. In another embodiment, the motor 204 may have one or more controls that allow multiple operating speeds or a range of operating speeds. In another embodiment, the motor 204 may be a DC motor operated by one or more batteries or another self-contained power source. In another embodiment, the motor 204 may be an explosion-proof motor. In one embodiment, the motor 204, when activated, is configured to drive the blower 212, and the blower 212 is configured to provide a volume of at least 120 cubic feet per minute of filtered air 132 to the outlet port 224. In one embodiment, the motor 204 and blower 212 may be rated to provide 228 cubic feet per minute (cfm) of air flow.

The blower 212 is affixed to the motor 204 and arranged between the motor 204 and the first hole 256. The blower 212 is configured to pull filtered air 132 from inside the container 208 and blow the filtered air 132 through the outlet port 224. In one embodiment, the outlet port 224 may be covered by a louver, grating, or other structure that allows filtered air 132 to blow out of the outlet port 224 while keeping objects including hand/fingers out of the blower 212 when in operation. In one embodiment, the louver, grating, or other structure (or the outlet port 224 itself, if the louver, grating, or other structure is permanently attached to the outlet port 224) may be removed in order to attach a hose 212, as described previously.

Referring now to FIG. 2D, an illustration depicting a section view A-A of the unmounted air filtration device 200 in accordance with embodiments of the present invention is shown. The section view A-A corresponds to section lines A-A shown in FIG. 2A.

FIG. 2D illustrates filtration media 236 within the container. Filtration media 236 is disposed within the container 208, and is configured to absorb an odor present in inlet air 128. Human smell through olfactory means is the standard gauge for how much odor is present in the air 120, 124. In the case of mercaptan, it is detectable to the average person at parts per billion. Where detection equipment is available, it may be used to provide evidence of all odor being removed.

FIG. 2D shows the container 208 approximately 70% full of the media 236, but the amount of filtration media 236 within the container 208 may vary. In general, more filtration media 236 (up to the capacity of the container 208) will allow more time between filtration media 236 replacement and a greater volume of inlet air 128 to be processed. Less filtration media 236 requires less time between filtration media 236 replacement, but may reduce weight of the air filtration device 200 to facilitate easier movement.

In one embodiment, the container 208 may be configured for all inlet air 128 to be filtered through the filtration media 236 without passing through anything other than the filtration media 236. For example, there may be no other structures within the container 208 such as baskets to hold filtration media 236 or manifolds/ducting to direct either inlet air 128 or filtered air 132.

The filtration media 236 may be virgin pelletized activated carbon in the preferred embodiment. For example, the filtration media 236 may be virgin pelletized activated carbon (VPAC) supplied by Riley Equipment Company. VPAC is a cylindrical-shaped carbon made from a carefully selected grade of coal. It is pelletized under rigidly controlled conditions using a high quality binder. This activated carbon possesses a high mechanical strength and has a good distribution of macro and micro pores. Its shape offers a low flow resistance. It provides superior adsorption of hydrocarbons, halogenated hydrocarbons, benzene, aromatics, acetone, ethanol, freons, solvents and mercaptans. VPAC has the following carbon properties:

Total Surface Area, minimum (BET Method): 1050-1200 meters$^2$/gram
 Bulk Density (lbs./Ft$^2$): 30
 Pore Volume (Hg displacement): 0.70-0.95 cc/gram
 Hardness Number, minimum (ASTM 03802): 97
 Iodine Number, minimum (ASTM 04607): 1050 mg/gram
 CCL4 Activity, minimum (ASTM 03467): 60%
 Moisture, maximum (ASTM 02867): 5%
 Available Pellet Size: 4 mm
 Mean Particle Diameter: 3.7 mm In other embodiments where different odors than mercaptan are removed from inlet air 128, different filtration media 236 than virgin pelletized activated carbon may be required. In all embodiments, the filtration media 236 is in direct contact with interior surfaces of the container 208. That is, because the present invention does not rely on a basket or other structure to remove or add filtration media 236, the filtration media 236 is in direct contact with interior surfaces of the container 208.

Referring now to FIG. 2E, an illustration depicting an exploded view of the unmounted air filtration device 200 in accordance with embodiments of the present invention. The exploded view illustrates the main components of the air filtration device 200 in more detail.

The blower 212 may be coupled to the outlet port 224 through an exhaust coupler 220. This may facilitate replacement of the outlet port 224 by a hose 212 for applications where the air filtration device 200 may not be in immediate proximity to air with gas odor removed 124.

The container 208 may include a removable lid with gasket 260. The lid 260 may be removed in order to allow filtration media 236 to be added to or removed from the container 208. Preferably, the filtration media 236 should be replaced when gas odor (e.g., mercaptan odor) is detected in the filtered air 132 when the air filtration device 200 is in operation. The lid 260 may include a gasket affixed to an inside surface of the lid 260 when attached to the container 208. This may provide an air seal to prevent air within the container 208 leaking outside the container 208 through a gap between the container 208 and the lid 260. The lid with gasket 260 may also have a first hole 252. The first hole 252 may be centrally located in the lid with gasket 260, or offset by some distance from center. The vacuum apparatus 232 is coupled to the first hole 252 and is configured to pull inlet air 128 through the filtration media 236 from the second hole 256 and provide filtered air 132 to the first hole 252.

In one embodiment, on the inlet air 128 side, the hose coupler 216 is attached to an inlet elbow 248, which redirects inlet air 128 flow upward through a second hole 256 into the container 208 and filtration media 236. The second hole 256 may be centrally located in a bottom surface of the container 208, or offset by some distance from center. In one embodiment, the second hole 256 may be located in a second lid with gasket (not shown) that is similar in function to the lid with gasket 260. The inlet elbow 248 is coupled to a bulkhead coupler 240, which is attached to the bottom of the container 208 (or a second lid with gasket) and the second hole 256. An inlet grate 244 may be attached to an end of the bulkhead coupler 240 that extends through the second hole 256 within the container 208. The inlet grate 244 may have openings that are sized to prevent the filtration media 236 from passing through the bulkhead coupler 240, inlet elbow 248, or hose coupler 216, but still allow a high volume of inlet air 128 to pass through it. It may be generally preferred that the first hole 252 and second hole 256 are centrally located in order to evenly utilize the filtration media 236. Aside from the first 252 and second 256 holes, the container 208 is sealed to prevent inlet air 128 from escaping the container 208. In one embodiment, the hose coupler 216 is coupled to the second hole 256, and is configured to attach to a first end of a hose 212 and allow inlet air 128 to pass therethrough, and a second end of the hose 212 may be positioned in proximity to an area where the odor may be detected 120.

In one embodiment, the first hole 252 may be in a first end of the container 208 and the second hole 256 may be in a second end of the container 208 opposite the first hole 252. For example, the first hole 252 may be located near an edge of the lid and gasket 260, and the second hole 256 may be located near an edge of the bottom surface of the container 208 (or a second lid with gasket) so that the first 252 and second 256 holes are diagonally separated across a length of the container 208. This may result in a longer path for the inlet air 128 and filtered air 132 to traverse through a given volume of filtration media 236 and may result in more effective odor filtration.

In one embodiment, the container 208 may include a top and/or bottom manifold to distribute airflow to a series of holes evenly distributed around the top and/or bottom surfaces. This may improve evenness of air flow and maximize utilization of the filtration media 236 before the filtration media needs to be replaced.

Referring now to FIG. 3A, an illustration depicting an isometric view of a cart 300 in accordance with embodiments of the present invention is shown. The cart 300 may improve mobility of the air filtration device 200. In one embodiment, the cart 300 may be a modified form of hand cart, as shown. The cart may include a cart frame 304, an axle 320, wheels 312 (shown as wheel 312A on one side of the cart 300, and another wheel 312B on an opposite side of the cart 300) attached to the axle 320, a cart handle 308, and an air filtration device support platform 316. The cart 300 may commonly be of welded construction, although other forms of the cart 300 and construction known in the art may be utilized within the scope of the present application.

The air filtration device 200 may be placed on the air filtration device support platform 316 and coupled to the cart 300 using straps or other retention devices and hardware known in the art. In one embodiment, the air filtration device support platform 316 may have an offset above the ground and an opening in order for the bulkhead coupler 240, inlet elbow 248, and hose coupler 216 to pass through and not touch the ground when the air filtration device 200 is mounted on the cart 300. This is shown in more detail in FIGS. 4A-4C.

Referring now to FIG. 3B, an illustration depicting a side view of the cart 300 in accordance with embodiments of the present invention is shown. One wheel 312A is visible from the side view. The cart handle 308 allows one individual to move the air filtration device 200 when the air filtration device 200 has been secured to the cart 300. The air filtration device 200 may be secured to the cart 300 with one or more ratchet straps or other securing means known in the art.

Referring now to FIG. 3C, an illustration depicting a front view of the cart 300 in accordance with embodiments of the present invention is shown. In the front view of FIG. 3C, both wheels 312A, 312B are visible.

Referring now to FIG. 4A, an illustration depicting an isometric view of a mounted air filtration device 400 in accordance with embodiments of the present invention is shown. The mounted air filtration device 400 includes the air filtration device 200 securely mounted to the cart 300. Inlet air 128 is drawn into the air filtration device 200 from the lower portion and filtered air 132 is provided through the top portion.

Referring now to FIG. 4B, an illustration depicting a side view of the mounted air filtration device 400 in accordance with embodiments of the present invention is shown. In the illustrated embodiment, hoses 212 may not be attached to the mounted air filtration device 400. In this way, the mounted air filtration device 400 may be moved to locations by an individual. When hoses 212 are not attached, the mounted air filtration device 400 may be placed in a location having air with a gas odor 120 and may filter the inlet air 128 gradually through the filtration media 236. It may be necessary to replace the filtration media 236 multiple times depending on the volume of air with gas odor 120, or if the location includes a gas leak.

Referring now to FIG. 4C, n illustration depicting a front view of the mounted air filtration device 400 in accordance with embodiments of the present invention is shown. As can be seen in FIG. 4C, the cart 300 includes sufficient clearance so that a hose 212 may be attached to the hose coupler 216.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A device, comprising:
   a container, comprising:
      a first hole in a first end of the container; and
      a second hole in a second end of the container opposite the first end;
   filtration media, disposed within the container, configured to absorb an odor present in inlet air; and
   a vacuum apparatus, coupled to the first hole, configured to pull inlet air through the filtration media from the second hole and provide filtered air to an outlet port, the vacuum apparatus comprising an explosion-proof electrical motor and the outlet port comprising a grating configured to allow filtered air to pass therethrough while blocking fingers and larger objects.

2. The device of claim 1, wherein aside from the first and second holes, the container is sealed to prevent inlet air from escaping the container.

3. The device of claim 1, wherein the container is configured for all inlet air to be filtered through the filtration media without passing through anything other than the filtration media.

4. The device of claim 1, further comprising:
   a hose, comprising a first end and a second end; and
   a hose coupler, coupled to the second hole and the first end of the hose, configured to allow inlet air to pass therethrough,
   wherein the second end of the hose is positioned within an area where the odor may be detected.

5. The device of claim 1, wherein the filtration media comprises virgin pelletized activated carbon.

6. The device of claim 1, wherein the vacuum apparatus comprises:
   a blower, coupled to the motor and the first hole, configured to pull filtered air from the container and blow the filtered air through the outlet port.

7. The device of claim 6, wherein the motor, when activated, is configured to drive the blower, wherein the blower is configured to provide a volume of at least 120 cubic feet per minute of filtered air to the outlet port.

8. The device of claim 1, wherein the first end of the container comprises:
   a lid, comprising the first hole; and
   a gasket, affixed to an inner surface of the lid, wherein the gasket is configured to prevent inlet air and filtered air from passing through a joint between the container and the lid in response to the lid is affixed to the container.

9. The device of claim 1, wherein the filtration media is in direct contact with interior surfaces of the container.

10. The device of claim 1, wherein the device is configured to be affixed to a wheeled cart to facilitate transportation and movement.

11. A system, comprising:
    an air filtration device, comprising:
       a container, comprising:
          a first hole to provide filtered air outside the container; and
          a second hole to receive inlet air;
       filtration media, disposed within the container, configured to absorb an odor present in the inlet air;
       a vacuum apparatus, coupled to the first hole, configured to pull inlet air through the filtration media from the second hole to the first hole and provide filtered air through an outlet port coupled to the vacuum apparatus, the vacuum apparatus comprising an explosion-proof electrical motor and the outlet port comprising a grating configured to allow filtered air to pass therethrough while blocking fingers and larger objects; and
    a hose, coupled to the container.

12. The system of claim 11, further comprising:
    a wheeled cart, secured to the air filtration device, configured to allow the air filtration device to be moved to a location.

13. The system of claim 11, wherein the first hole is in a first end of the container and the second hole is in a second end of the container opposite the first end.

14. The system of claim 11, wherein the vacuum apparatus comprises:
    a blower, affixed to the motor and arranged between the motor and the first hole, configured to pull filtered air from inside the container and blow the filtered air through the outlet port.

15. The system of claim 14, wherein the motor, when activated, is configured to drive the blower, wherein the blower is configured to provide a volume of at least 120 cubic feet per minute of filtered air to the outlet port.

16. The system of claim 11, wherein the container comprises:
- a lid, comprising the first hole; and
- a gasket, affixed to an inner surface of the lid, configured to prevent inlet air and filtered air from passing through a joint between the container and the lid in response to the lid is affixed to the container.

17. The system of claim 11, wherein the filtration media is in direct contact with interior surfaces of the container.

18. The system of claim 11, wherein a first end of the hose is coupled to the second hole and a second end of the hose is placed within an area where the odor is present, wherein the air filtration device is placed within an area where the odor is not present.

19. The system of claim 11, wherein a first end of the hose is coupled to the outlet port and a second end of the hose is placed within an area where the odor is not present, wherein the air filtration device is placed within an area where the odor is present.

\* \* \* \* \*